(12) United States Patent
Higashiyama et al.

(10) Patent No.: US 10,703,298 B2
(45) Date of Patent: Jul. 7, 2020

(54) DISPLAY DEVICE, DISPLAY CONTROL METHOD, AND STORAGE MEDIUM

(71) Applicant: HONDA MOTOR CO., LTD., Minato-ku, Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/513,777

(22) Filed: Jul. 17, 2019

(65) Prior Publication Data

US 2020/0047688 A1 Feb. 13, 2020

(30) Foreign Application Priority Data

Aug. 7, 2018 (JP) .................................. 2018-148548

(51) Int. Cl.
*B60R 11/02* (2006.01)
*H04N 9/31* (2006.01)
*G02B 27/01* (2006.01)

(52) U.S. Cl.
CPC ...... *B60R 11/0264* (2013.01); *B60R 11/0229* (2013.01); *G02B 27/0101* (2013.01); *H04N 9/3152* (2013.01); *B60R 2300/205* (2013.01); *B60R 2300/308* (2013.01)

(58) Field of Classification Search
CPC ............. B60R 11/0264; B60R 11/0229; B60R 2300/308; B60R 2300/205; H04N 9/3152; H04N 9/3194; H04N 9/3144; H04N 9/3182; G02B 27/0101; B60K 2370/23; B60K 2370/1529; B60K 35/00
See application file for complete search history.

(56) References Cited

U.S. PATENT DOCUMENTS

2018/0061129 A1* 3/2018 Sisbot ..................... G06T 17/05
2018/0149867 A1* 5/2018 Kremers ............ G02B 27/0101
2018/0180878 A1* 6/2018 Yokoe .................... B60K 35/00

FOREIGN PATENT DOCUMENTS

JP          2017-091115          5/2017

* cited by examiner

*Primary Examiner* — Andrew Sasinowski
(74) *Attorney, Agent, or Firm* — Amin, Turocy & Watson, LLP

(57) ABSTRACT

A display device includes an image generation device configured to allow a viewer to recognize the image, a control device configured to control the image generation device, a light projector configured to output the image as light, an optical mechanism capable of adjusting a distance from a predetermined position to a position at which the light is formed as a virtual image, a concave mirror configured to reflect light passing through the optical mechanism toward a reflector, a first actuator configured to adjust the distance in the optical mechanism, and a second actuator configured to adjust a reflection angle of the concave mirror. The control device estimates a temperature of the light projector, and in a case in which the estimated temperature is equal to or higher than a predetermined upper limit temperature, the control device causes the first actuator to reduce the distance.

9 Claims, 9 Drawing Sheets

FIG. 5

| DETECTED TEMPERATURE OF LIGHT PROJECTOR | DETECTED TEMPERATURE OF OPTICAL MECHANISM | ESTIMATED TEMPERATURE OF DISPLAY ELEMENT |
|---|---|---|
| −20[°C] | −25[°C] | −19[°C] |
| 0[°C] | −5[°C] | 1[°C] |
| 20[°C] | 15[°C] | 26[°C] |
| ⋮ | ⋮ | ⋮ |
| 55[°C] | 55[°C] | 60[°C] |
| 63[°C] | 64[°C] | 70[°C] |
| 72[°C] | 73[°C] | 80[°C] |
| ⋮ | ⋮ | ⋮ |

FIG. 7

| VIRTUAL IMAGE VISUAL RECOGNITION DISTANCE BEFORE CHANGE D1 | ALLOWABLE VIRTUAL IMAGE VISUAL RECOGNITION DISTANCE AFTER CHANGE D2 |
|---|---|
| 50 [m] | 35 [m] |
| ⋮ | ⋮ |
| 20 [m] | 14 [m] |
| 15 [m] | 11 [m] |
| 2 [m] | 1.8 [m] |
| ⋮ | ⋮ |

# DISPLAY DEVICE, DISPLAY CONTROL METHOD, AND STORAGE MEDIUM

CROSS-REFERENCE TO RELATED APPLICATION

Priority is claimed on Japanese Patent Application No. 2018-148548, filed Aug. 7, 2018, the content of which is incorporated herein by reference.

BACKGROUND

Field of the Invention

The present invention relates to a display device, a display control method, and a storage medium.

Description of Related Art

In the related art, a head up display (HUD) device that displays an image related to basic information for a driver on a front windshield is known (refer to, for example, Patent Literature 1). Using this HUD device, the driver is able to ascertain various pieces of displayed information while maintaining a direction of a line of sight to the front at the time of driving by displaying various marks indicating an obstacle, a reminder, and a progress direction superimposed on a landscape in front of a vehicle (for example, Japanese Unexamined Patent Application First Publication No. 2017-91115).

SUMMARY

However, in the related art, in a case in which sunlight is incident on an HUD device, excessive heat may be stored inside a device, particularly in a display element.

An aspect of the present invention has been made in consideration of such circumstances and an object of the aspect of the present invention is to provide a display device, a display control method, and a storage medium in which a tolerance to a temperature rise due to sunlight is improved.

A display device, a display control method, and a storage medium according to the present invention adopt the following constitutions.

(1): A display device according to an aspect of the present invention includes an image generation device configured to superimpose an image on a landscape and allow a viewer to visually recognize the image, a control device configured to control the image generation device, a light projector configured to output the image as light, an optical mechanism provided on a path of the light and capable of adjusting a distance from a predetermined position to a position at which the light is formed as a virtual image, a concave mirror configured to reflect light passing through the optical mechanism toward a reflector, a first actuator configured to adjust the distance in the optical mechanism, and a second actuator configured to adjust a reflection angle of the concave mirror. The control device estimates a temperature of the light projector, and in a case in which the estimated temperature is equal to or higher than a predetermined upper limit temperature, the control device causes the first actuator to reduce the distance.

(2): In the aspect of (1) described above, in a case in which the estimated temperature is equal to or higher than the predetermined upper limit temperature, the control device causes the light projector to reduce a luminance of the light.

(3): In the aspect of (1) or (2) described above, in a case in which the estimated temperature is equal to or higher than the predetermined upper limit temperature, the control device causes the light projector to gradually reduce a luminance of the light or causes the first actuator to gradually reduce the distance.

(4): In the aspect of (3) described above, when the control device gradually controls the light projector or the first actuator, in a case in which the estimated temperature is equal to or higher than the predetermined upper limit temperature, the control device causes the first actuator to reduce the distance, in a case in which the estimated temperature is equal to or higher than the predetermined upper limit temperature and a first condition is satisfied, the control device causes the light projector to reduce the luminance, and in a case in which the estimated temperature is equal to or higher than the predetermined upper limit temperature and a second condition is satisfied, the control device causes the light projector to further reduce the distance.

(5): In the aspect of (1) described above, the control device measures a position and a direction of a subject device, and estimates the temperature in accordance with the measured information.

(6): In the aspect of (1) described above, the control device causes the first actuator to change an angle of the concave mirror so that the angle becomes an angle capable of reducing an influence of sunlight on the light projector.

(7): In the aspect of (1) described above, in a case in which a vehicle on which a subject device is mounted is stopped, the control device operates a light shielding material that blocks the path of the light so that sunlight is not incident on the light projector.

(8): A display control method to control a display device using a computer, the display device comprising: an image generation device configured to superimpose an image on a landscape and allow a viewer to visually recognize the image; a control device configured to control the image generation device; a light projector configured to output the image as light; an optical mechanism provided on a path of the light and capable of adjusting a distance from a predetermined position to a position at which the light is formed as a virtual image; a concave mirror configured to reflect light passing through the optical mechanism toward a reflector; a first actuator configured to adjust the distance in the optical mechanism; and a second actuator configured to adjust a reflection angle of the concave mirror, wherein the display control method comprises: estimating a temperature of the light projector; and causing the first actuator to reduce the distance in a case in which the estimated temperature is equal to or higher than a predetermined upper limit temperature.

(9): A non-transitory computer-readable storage medium that stores a program for a display device, the display device comprising: an image generation device configured to superimpose an image on a landscape and allow a viewer to visually recognize the image; a control device configured to control the image generation device; a light projector configured to output the image as light; an optical mechanism provided on a path of the light and capable of adjusting a distance from a predetermined position to a position at which the light is formed as a virtual image; a concave mirror configured to reflect light passing through the optical mechanism toward a reflector; a first actuator configured to adjust the distance in the optical mechanism; and a second actuator configured to adjust a reflection angle of the concave mirror, wherein the program causes a computer} mounted in the display device to: estimate a temperature of the light projector; and cause the first actuator to reduce the distance in a case in which the estimated temperature is equal to or higher than a predetermined upper limit temperature.

According to the aspects of (1) to (9), it is possible to improve a tolerance to a temperature rise due to sunlight.

BRIEF DESCRIPTION OF THE DRAWINGS

FIG. 5 is a diagram showing an example of an estimated temperature table.

FIG. 7 is a diagram showing a relationship between a virtual image visual recognition distance before change and an allowable virtual image visual recognition distance after the change.

DESCRIPTION OF EMBODIMENTS

Hereinafter, embodiments of a display device, a display control method, and a storage medium of the present invention will be described with reference to the drawings. The display device is, for example, a device that is mounted on a vehicle (hereinafter referred to as a vehicle M) and causes an image to be viewed by being superimposed on a landscape. The display device is able to be referred to as an HUD device. As an example, a display device is a device that allows a viewer to visually recognize a virtual image by projecting light including an image on a front windshield of the vehicle M. The viewer is, for example, a driver, however, the viewer may be a passenger other than the driver.

In the following description, a positional relationship and the like will be described using an XYZ coordinate system as appropriate.

First Embodiment

[Overall Constitution]

Figure 1:
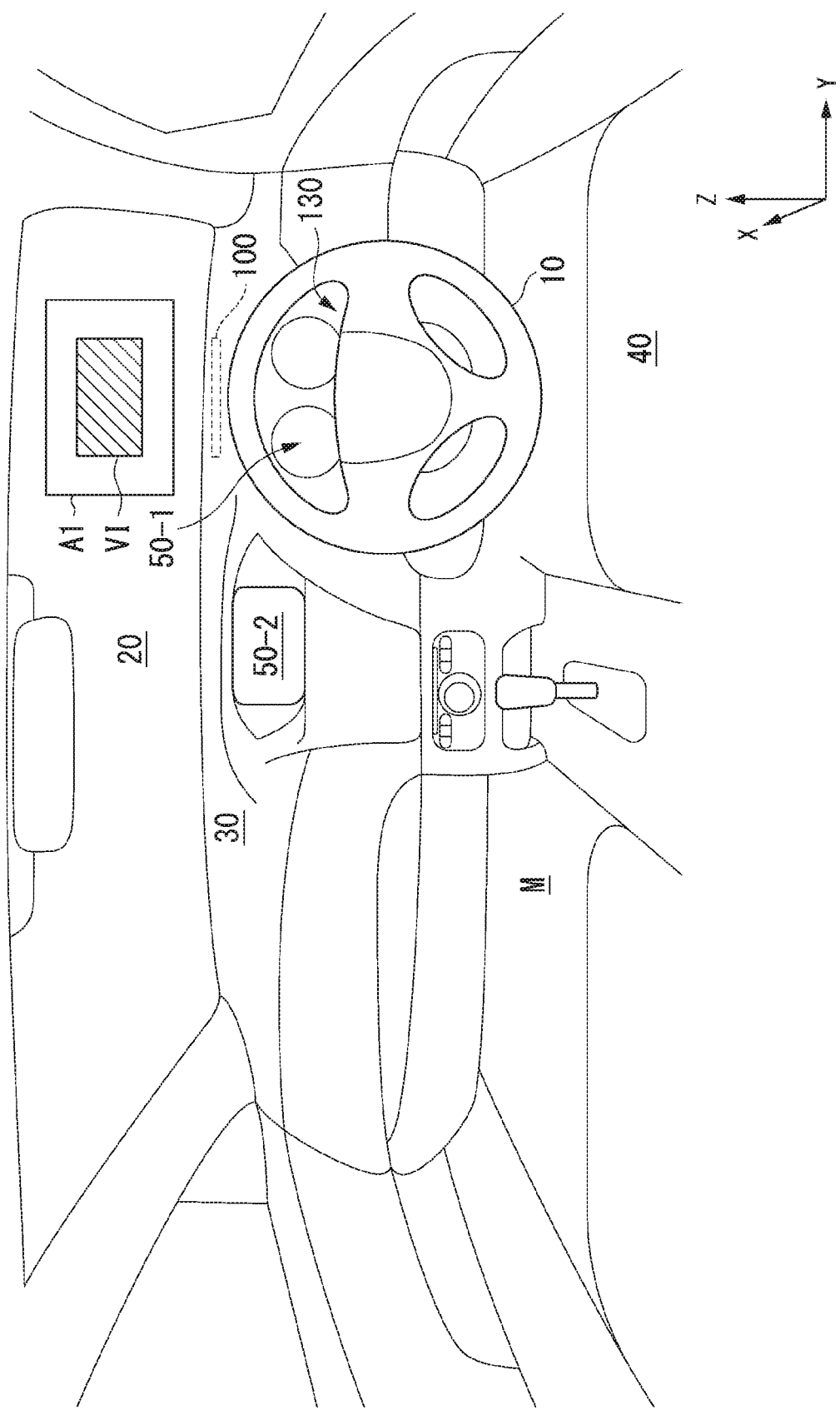
FIG. 1 is a diagram exemplifying a constitution of an interior of a vehicle M on which a display device according to an embodiment is mounted.

FIG. 1 is a diagram exemplifying a constitution of an interior of the vehicle M on which a display device 100 according to an embodiment is mounted. The vehicle M is provided with, for example, a steering wheel 10 that controls steering of the vehicle M, a front windshield (an example of a reflector) 20 that divides the interior of the vehicle from the outside of the vehicle, and an instrument panel 30. The front windshield 20 is a member having light transparency. The display device 100 allows the driver sitting in a driver's seat to visually recognize a virtual image VI by, for example, projecting light including an image on a displayable area A1 provided in a part of the front windshield 20 in front of a driver's seat 40.

The display device 100 allows the driver to visually recognize an image obtained by imaging, for example, information for supporting driving of the driver as a virtual image VI. The information for supporting the driving of the driver includes, for example, information such as a speed of the vehicle M, a driving power distribution ratio, engine revolutions, an operation state shift position of a driving support function, a sign recognition result, an intersection point position, and the like. The driving support function is, for example, a direction indication function, an adaptive cruise control (ACC), a lane keep assist system (LKAS), a collision mitigation brake system (CMBS), a traffic jam assist function, or the like.

In addition to the display device 100, the vehicle M may be provided with a first display device 50-1 and a second display device 50-2. The first display device 50-1 is a display device provided, for example, in the vicinity of the front of the driver's seat 40 in the instrument panel 30 and is able to be visually recognized by the driver from a gap of the steering wheel 10 or is able to be visually recognized through the steering wheel 10. The second display device 50-2 is attached to, for example, a central portion of the instrument panel 30. The second display device 50-2 displays, for example, an image corresponding to a navigation process performed by a navigation device (not shown) mounted on the vehicle M, or a video of the other party in a videophone or the like. The second display device 50-2 may display a television program, reproduce a DVD, or display contents such as a downloaded movie.

The vehicle M is provided with an operation switch (an example of an operator) 130 that receives an instruction to switch on/off of the display by the display device 100 or an instruction to adjust a position of the virtual image VI. The operation switch 130 is attached, for example, to a position where the driver sitting on the driver's seat 40 is able to operate without greatly changing a posture. The operation switch 130 may be provided, for example, in front of the first display device 50-1, may be provided on a boss portion of the steering wheel 10, or may be provided on a spoke that connects the steering wheel 10 and the instrument panel 30 with each other.

Figure 2:
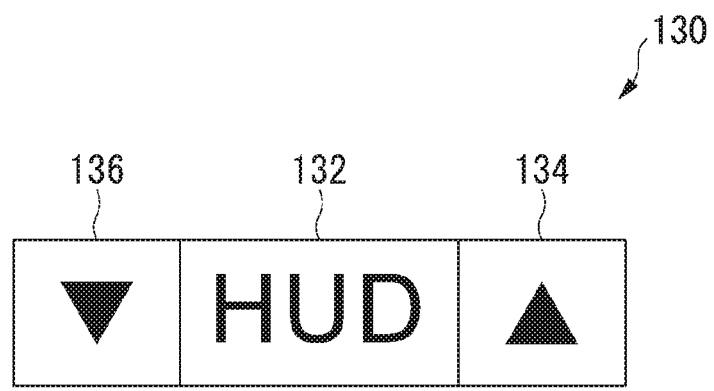
FIG. 2 is a diagram for describing an operation switch of the embodiment.

FIG. 2 is a diagram for describing the operation switch 130 of the embodiment. The operation switch 130 includes, for example, a main switch 132, and adjustment switches 134 and 136. The main switch 132 is a switch that switches on/off of the display device 100.

The adjustment switch 134 is, for example, a switch for receiving an instruction to move the position of the virtual image VI that is visually recognized as being in a space transmitted from a line of sight position P1 of the driver through the displayable area A1 to an upper side (hereinafter, referred to as an upward direction) with respect to a vertical direction Z. The driver is able to continuously move the visually recognized position of the virtual image VI in the upward direction in the displayable area A1 by continuously pressing the adjustment switch 134.

The adjustment switch 136 is a switch for receiving an instruction to move the position of the virtual image VI described above to a lower side (hereinafter, referred to as a downward direction) with respect to the vertical direction Z. The driver is able to continuously move the visually recognized position of the virtual image VI in the downward direction in the displayable area A1 by continuously pressing the adjustment switch 136.

The adjustment switch 134 may be a switch for increasing a brightness of the virtual image VI to be visually recognized instead of (or in addition to) moving the position of the virtual image VI in the upward direction. The adjustment switch 136 may be a switch for reducing the brightness of the virtual image VI to be visually recognized instead of (or in addition to) moving the position of the virtual image VI in the downward direction. Contents of the instruction received by the adjustment switches 134 and 136 may be switched on the basis of a certain operation. The certain operation is, for example, a long press operation of the main switch 132. In addition to the switches shown in FIG. 2, the operation switch 130 may include, for example, a switch for selecting display content or a switch for adjusting the brightness of the virtual image to be exclusively displayed.

Figure 3:
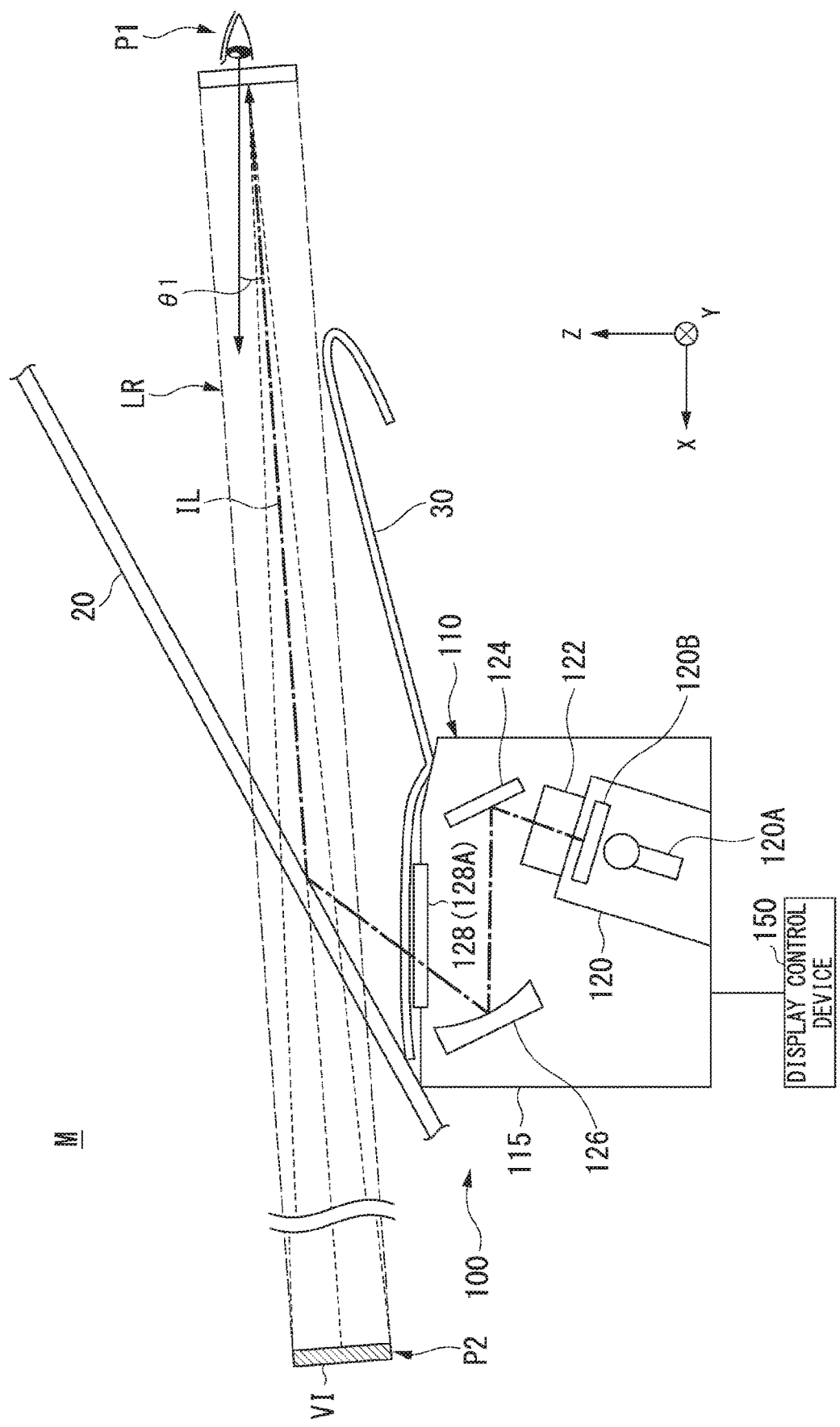
FIG. 3 is a partial constitution diagram of the display device.

FIG. 3 is a partial constitution diagram of the display device 100. The display device 100 includes, for example, a display 110 (an example of an image generation device) and a display control device (an example of a control device) 150. The display 110 accommodates a light projector 120, an optical mechanism 122, a plane mirror 124, a concave mirror 126, a light transmission cover 128, and a light shielding cover 128A, for example, in a housing 115. In addition to these, the display device 100 includes various sensors and actuators, which will be described later.

The light projector 120 includes, for example, a light source 120A and a display element 120B. The light source 120A is, for example, a cold cathode tube, and outputs visible light corresponding to the virtual image VI to be visually recognized by the driver. The display element 120B controls transmission of the visible light from the light source 120A. The display element 120B is, for example, a liquid crystal display (LCD) of a thin film transistor (TFT) type. The display element 120B incorporates an image element into the virtual image VI by controlling each of a plurality of pixels to control a transmission degree of the visible light from the light source 120A for each color element, and determines a form (look) of the virtual image VI. Hereinafter, the visible light transmitted through the display element 120B and including the image is referred to as image light IL. The display element 120B may be an organic EL display, and in this case the light source 120A may be omitted.

The optical mechanism 122 includes, for example, one or more lenses. The position of each lens is able to be adjusted, for example, in an optical axis direction. The optical mechanism 122 is provided, for example, on a path of the image light IL output from the light projector 120, and passes the image light IL incident from the light projector 120 and emits the image light IL toward the front windshield 20. The optical mechanism 122 is able to adjust, for example, a distance (hereinafter referred to as a virtual image visual recognition distance D) from the line of sight position P1 of the driver to a formation position P2 where the virtual image by the image light IL is formed by changing the position of the lens. The line of sight position P1 of the driver is a position where the image light IL is collected by being reflected by the concave mirror 126 and the front windshield 20, and is a position where it is assumed that the eyes of the driver are present at this position. The virtual image visual recognition distance D is strictly a distance of a line segment having an inclination in the vertical direction, however, in the following description, in a case in which it is expressed that "the virtual image visual recognition distance D is 7 [m]" or the like, the distance may mean the distance in the horizontal direction.

The optical mechanism 122 changes the virtual image visual recognition distance D in accordance with the speed of the vehicle M. For example, the optical mechanism 122 increases the virtual image visual recognition distance D in a case in which the speed of the vehicle M is high, and reduces the virtual image visual recognition distance D in a case in which the speed of the vehicle M is low. The optical mechanism 122 minimizes the virtual image visual recognition distance D while the vehicle M is stopped.

In the following description, a depression angle $\theta$ is defined as an angle formed by a horizontal plane passing through the line of sight position P1 of the driver and the line segment from the line of sight position P1 of the driver to the formation position P2. The more the virtual image VI is formed downward, that is, the more downward the line of sight direction at which the driver views the virtual image VI, the larger the depression angle $\theta$. The depression angle $\theta$ is determined on the basis of a reflection angle $\varphi$ of the concave mirror 126 and a display position of an original image on the display element 120B as described later. The reflection angle $\varphi$ is an angle formed by an incident direction in which the image light IL reflected by the plane mirror 124 is incident on the concave mirror 126 and an emission direction in which the concave mirror 126 emits the image light IL.

The plane mirror 124 reflects the visible light (that is, the image light IL) emitted by the light source 120A and having passed through the display element 120B in a direction of the concave mirror 126.

The concave mirror 126 reflects the image light IL incident from the plane mirror 124 and emits the image light IL toward the front windshield 20. The concave mirror 126 is supported so as to be rotatable (pivotable) about a Y axis that is an axis in a width direction of the vehicle M.

The light transmission cover 128 transmits the image light IL from the concave mirror 126 to cause the image light IL to reach the front windshield 20, and suppresses an entry of a foreign matter such as dust, dirt, or a water droplet into the housing 115. The light transmission cover 128 is provided in opening formed in an upper member of the housing 115. The instrument panel 30 is also provided with an opening or a light transmission member, and the image light IL passes through the light transmission cover 128 and the opening of the instrument panel 30 or the light transmission member to be reached to the front windshield 20. The light shielding cover 128A is provided, for example, in a form along the light transmission cover 128. The light shielding cover 128A is an example of a "light shielding material".

The image light IL incident to the front windshield 20 is reflected by the front windshield 20 and condensed at the line of sight position P1 of the driver. At this time, the driver feels that the image captured by the image light IL is displayed in front of the vehicle M.

Figure 4:
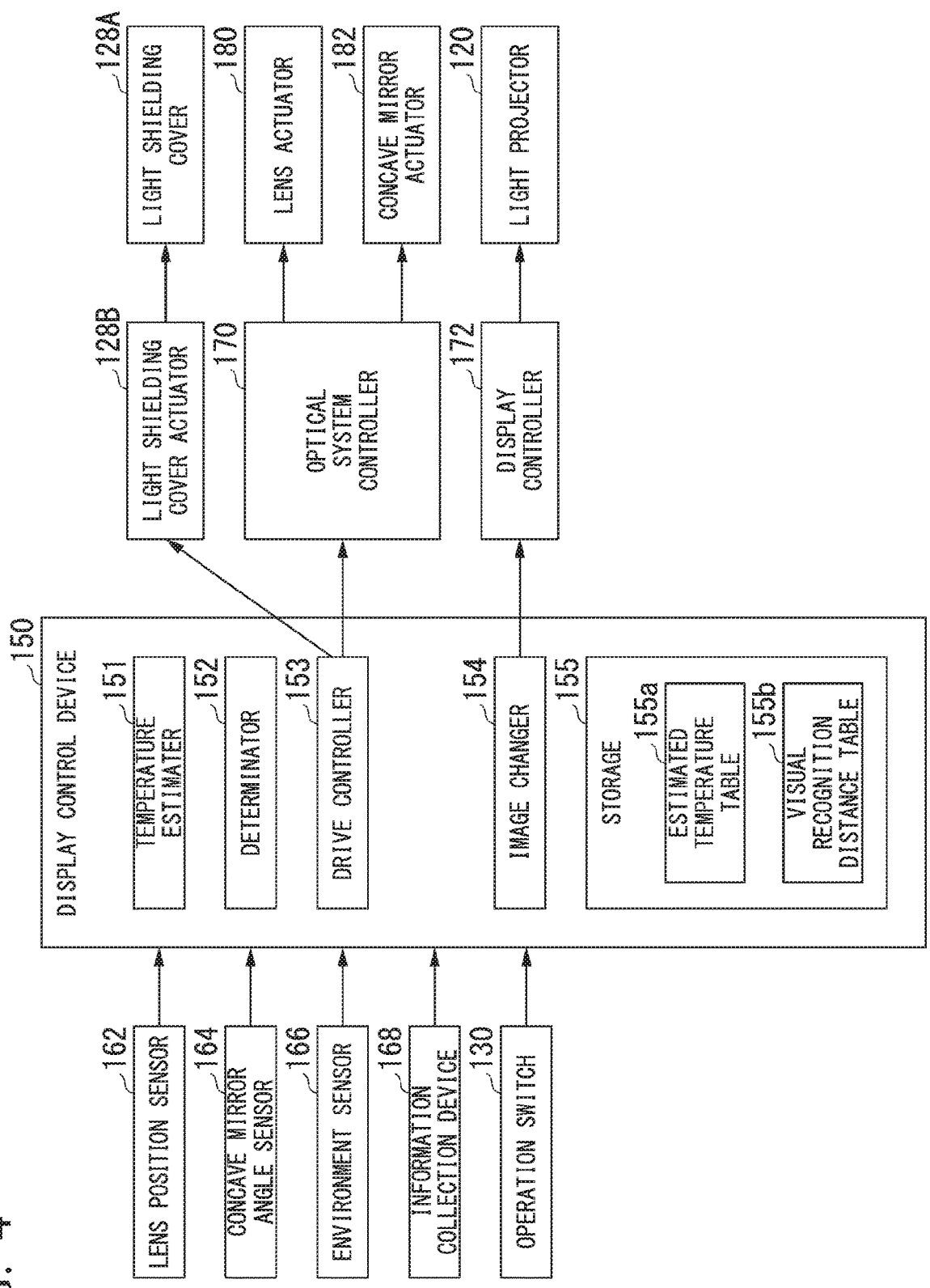
FIG. 4 is a diagram showing a constitution example of the display device centering on a display control device.

The display control device 150 controls the display of the virtual image VI to be visually recognized by the driver. FIG. 4 is a diagram showing a constitution example of the display device 100 centering on the display control device 150. In an example of FIG. 4, in addition to the display control device 150, a lens position sensor 162, a concave mirror angle sensor 164, an environment sensor 166, an information acquisition device 168, an operation switch 130, an optical system controller 170, a display controller 172, a lens actuator (an example of a first actuator) 180, a concave mirror actuator (an example of a second actuator) 182, the light projector 120, the light shielding cover 128A, and a light shielding cover actuator 128B, which are included in the display device 100 are shown.

The lens position sensor 162 detects a position of one or more lenses included in the optical mechanism 122. The concave mirror angle sensor 164 detects a rotation angle of the concave mirror 126 about the Y axis shown in FIG. 3.

The environment sensor 166 detects, for example, a temperature of the light projector 120, the optical mechanism 122, or the display element 120B. The information acquisition device 168 is, for example, an electronic control unit (ECU) or the like (for example, a brake ECU) mounted on the vehicle M, and acquires the speed and the steering angle of the vehicle M on the basis of an output of a sensor (not shown). The information acquisition device 168 detects an illuminance around the vehicle M. The environment sensor 166 may detect position information of the vehicle M that has received positioning information from a global positioning system (GPS), a global navigation satellite system (GNSS), or the like.

The display control device 150 includes, for example, a temperature estimater 151, a determinator 152, a drive controller 153, a image changer 154, and a storage 155. Each of these constitution elements (except for the storage 155) is realized, for example, by a hardware processor such as a central processor (CPU) executing a program (software). Some or all of these components may be realized by hardware (a circuit unit; including a circuitry) such as a large scale integration (LSI), an application specific integrated circuit (ASIC), a field-programmable gate array (FPGA), and a graphics processing unit (GPU) or may be realized by a cooperation of software and hardware. The program may be stored in advance in a storage device (not shown) such as a HDD or a flash memory of the display control device 150, stored in a removable storage medium such as a DVD or a CD-ROM, or may be installed in the HDD or the flash memory of the display control device 150 by attachment of a storage medium to a drive device.

The temperature estimater 151 estimates an estimated temperature of the display element 120B on the basis of the temperature of the light projector 120 or the optical mechanism 122 detected by the environment sensor 166, and outputs the estimated temperature to the determinator 152. The determinator 152 outputs a control instruction to the drive controller 153 and/or the image changer 154 in accordance with the estimated temperature output by the temperature estimater 151.

The drive controller 153 adjusts the position of the virtual image VI visually recognized by the driver, for example, in accordance with the operation content from the operation switch 130. For example, in a case in which the operation of the adjustment switch 134 is received, the drive controller 153 outputs, to the optical system controller 170, a first control signal for moving the position of the virtual image VI to the upward direction in the displayable area A1. Moving the virtual image VI to the upward direction is, for example, reducing the depression angle θ1 between the horizontal direction with respect to the line of sight position of the driver shown in FIG. 3 and the direction in which the virtual image VI is visually recognized from the line of sight position. In a case in which the drive controller 153 receives the operation of the adjustment switch 136, the drive controller 153 outputs, to the optical system controller 170, a first control signal for moving the position of the virtual image VI to the downward direction in the displayable area A1. Moving the virtual image VI to the downward direction is, for example, increasing the depression angle θ1.

The drive controller 153 outputs, to the optical system controller 170, a second control signal for adjusting the virtual image visual recognition distance D on the basis of, for example, the speed of the vehicle M detected by the information acquisition device 168. The drive controller 153 adjusts the position of virtual image VI visually recognized by the driver in accordance with the control instruction output by the determinator 152 and the estimated temperature output by temperature estimater 151.

The drive controller 153 drives the light shielding cover actuator 128B to open and close the light shielding cover 128A.

The image changer 154 changes a display aspect of the virtual image VI in accordance with the control instruction output by the determinator 152 and the estimated temperature output by the temperature estimater 151. The change of the display aspect by the image changer 154 will be described later.

The storage 155 stores an estimated temperature table 155a referred to by the temperature estimater 151 and a visual recognition distance table 155b referred to by the drive controller 153 and the image changer 154.

The optical system controller 170 drives the lens actuator 180 or the concave mirror actuator 182 on the basis of the first control signal or the second control signal received by the drive controller 153. The lens actuator 180 drives a motor or the like to move a position of one or more lenses, and adjusts the virtual image visual recognition distance D in the optical mechanism 122. The concave mirror actuator 182 drives a motor or the like to adjust the reflection angle of the concave mirror 126.

For example, the optical system controller 170 drives the lens actuator 180 on the basis of the first control signal acquired by the drive controller 153, and the drives the concave mirror actuator 182 on the basis of the second control signal acquired from the drive controller 153.

The lens actuator 180 acquires a drive signal from the optical system controller 170, drives a motor or the like on the basis of the acquired drive signal, and moves the position of one or more lenses included in the optical mechanism 122. Therefore, the virtual image visual recognition distance D is adjusted.

The concave mirror actuator 182 acquires a drive signal from the optical system controller 170, drives a motor or the like on the basis of the acquired drive signal, and rotates the concave mirror actuator 182 about the Y axis to adjust the reflection angle φ of the concave mirror 126. Therefore, the depression angle θ is adjusted.

The display controller 172 causes the light projector 120 to project predetermined image light IL on the basis of the display control information from the image changer 154.

[Temperature Estimation Method by Environment Sensor 166]

Hereinafter, the temperature estimation method of the display element 120B by the temperature estimater 151 will be described. There is a possibility that the display element 120B may be deformed or out of order in a case in which sunlight is incident and stored for a long time. Therefore, the temperature estimater 151 estimates the temperature of the display element 120B, and blocks the sunlight, reduces a heat generation amount and a heat storage amount of the display device 100 itself, or stops the use of the display device 100 in a case in which there is a possibility of deformation or breakdown.

Figure 6:
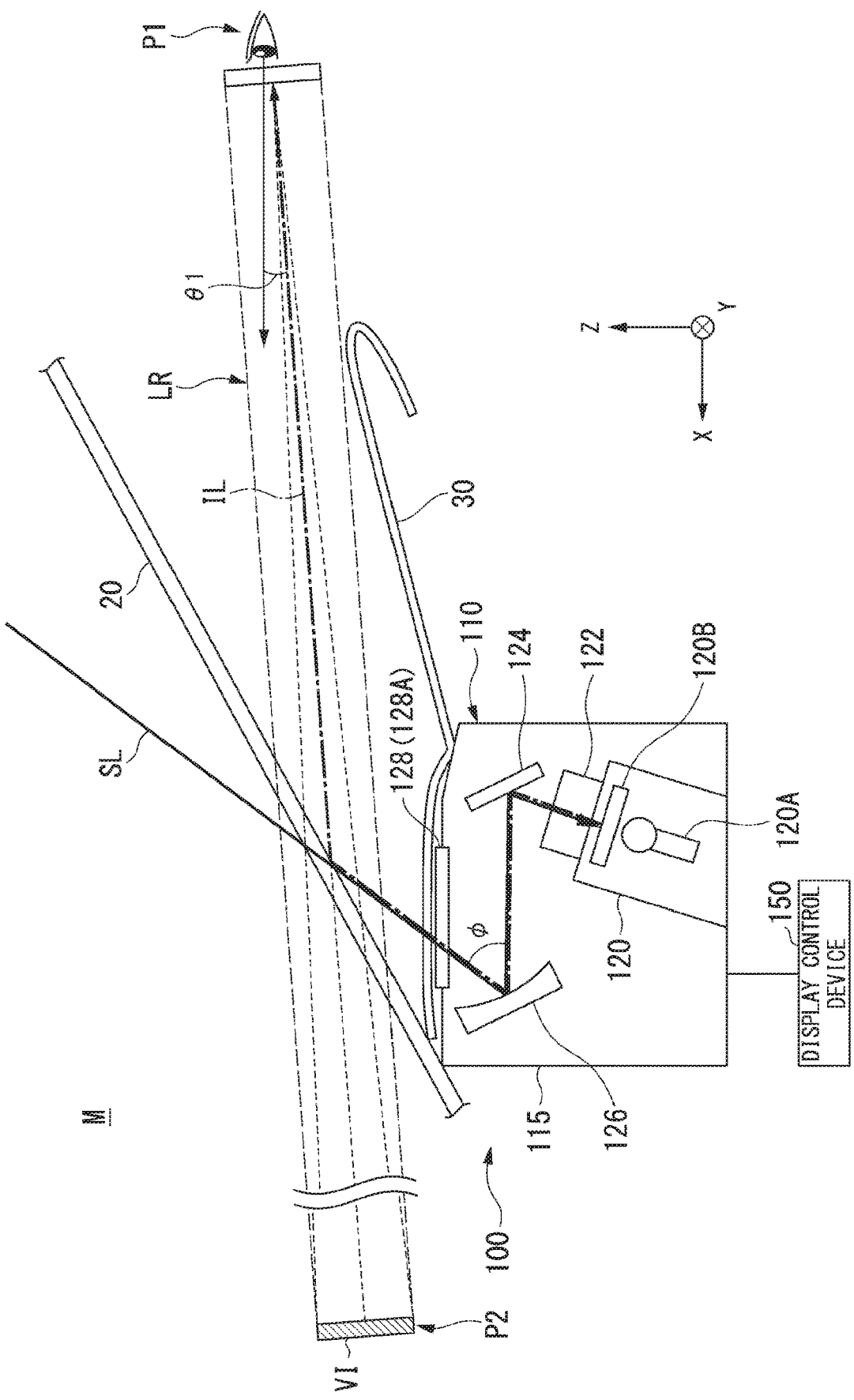
FIG. 6 is a diagram showing an aspect in which sunlight is incident on a display device.

FIG. 6 is a diagram showing an aspect in which sunlight SL is incident on the display device 100. In a case in which the sunlight SL is incident on the concave mirror 126 at the same angle φ (however, a progress direction is opposite to that of the image light IL) as that of the image light IL displaying the virtual image VI, the sunlight SL reaches the light projector 120 through the plane mirror 124 and is collected. At this time, the light projector 120 (in particular, the display element 120B) stores the energy in a case in which the sunlight SL is collected. Even in a case in which the angle at which the sunlight SL is incident is not the same angle φ as that of the image light IL, there is a possibility that irregularly reflected sunlight SL may reach the light projector 120 through the plane mirror 124 and may be collected by incident.

Therefore, the temperature estimater 151 first estimates the temperature of the display element 120B, for example, with reference to the estimated temperature table 155a on the basis of the temperature of the light projector 120 or the optical mechanism 122 detected by the environment sensor 166. FIG. 5 is a diagram showing an example of the estimated temperature table 155a. For example, in a case in which the temperature of the light projector 120 is detected by the environment sensor 166 as 0[° C.], the temperature estimater 151 estimates that the estimated temperature of the display element 120B is 1[° C.] with reference to the estimated temperature table 155a. The estimated temperature table 155a may be provided for each of an operation time and a non-operation time of the display device 100. The estimated temperature table 155a may use the virtual image visual recognition distance D of the virtual image VI or the luminance of the virtual image VI as a temperature estimation element in the operation time of the display device 100.

[Other Temperature Estimation Methods]

The temperature estimater 151 may derive the estimated temperature of the display element 120B on the basis of the positioning information that is the position information of the vehicle M acquired from the information acquisition device 168. The temperature estimater 151 derives an incident angle at which the sunlight is incident on the concave mirror 126 on the basis of, for example, the positioning information, the traveling direction of the vehicle M, the weather around the vehicle M, the date and time of derivation time, and the like, and estimates an increased temperature of the display element 120B per unit time from the derived incident angle of the sunlight.

[Adjustment of Virtual Image Visual Recognition Distance]

In a case in which it is estimated that the estimated temperature of the display element 120B estimated by the temperature estimater 151 is equal to or higher than a predetermined upper limit temperature (for example, about 60[° C.]) at which there is a possibility of the deformation or breakdown, or in a case in which a time during which the estimated temperature is equal to or higher than the predetermined upper limit temperature exceeds a predetermined upper limit time (for example, 5 to 10 [min]), the image changer 154 changes the virtual image visual recognition distance D of the virtual image VI by changing the distance between the lens of the optical mechanism 122 and the display element 120B in accordance with the estimated temperature of the display element 120B to reduce the influence of the sunlight incident on the display device 100.

The display control device 150 increases the visibility of the virtual image VI by setting the virtual image visual recognition distance D to be long at normal times. On the other hand, it can be said that a state in which the virtual image visual recognition distance D is set to be long is a state in which the light collection efficiency is increased, and it is likely to receive the influence of heat caused by the sunlight SL in a case in which the sunlight SL is incident on the display device 100.

Therefore, the determinator 152 determines that the heat storage amount caused by the sunlight SL is reduced by causing the image changer 154 to reduce the virtual image visual recognition distance D. At this time, in a case in which the virtual image visual recognition distance D is sharply reduced, the visibility of the driver may be significantly reduced. The image changer 154 first reduces the virtual image visual recognition distance D to a degree that a degree of reduction of the visibility of the driver is acceptable. The acceptable degree of the reduction of the visibility means, for example, that a possibility that the driver notices a change of the virtual image visual recognition distance D or feels a sense of discomfort is equal to or less than a predetermined ratio (almost not noticed).

FIG. 7 is a diagram showing a relationship between a virtual image visual recognition distance (hereinafter, distance D1) before the change and an allowable virtual image visual recognition distance (hereinafter, distance D2) after the change. For example, in a case in which the distance D1 before the change is 15 [m], the image changer 154 may reduce the distance D2 to 11 [m], and a possibility that the driver feels the reduction of the visibility is equal to or less than the predetermined ratio. On the other hand, in a case in which the distance D1 before the change is 10 [m], the image changer 154 may reduce the distance D2 to 7.5 [m].

[Adjustment of Luminance]

In a case in which it is estimated that the estimated temperature of display element 120B estimated by the temperature estimater 151 is equal to or higher than the predetermined upper limit temperature, or in a case in which the time during which the estimated temperature is equal to or higher than the predetermined upper limit temperature exceeds the predetermined upper limit time, the determinator 152 suppresses the heat generation amount of the display device 100 itself by reducing the luminance of the virtual image VI in accordance with the estimated temperature of the display element 120B. The determinator 152 may reduce the heat generation amount of the display element 120B by causing the display element 120B to perform underclocking control through the drive controller 153. The underclocking control is to reduce a frequency of an operation clock signal of a device for the purpose of reducing power consumption or heat generation.

[Control of Light Shielding Cover]

The determinator 152 may cause the light shielding cover actuator 128B to control the light shielding cover 128A through the drive controller 153 while the vehicle M is stopped to prevent the incidence of the sunlight SL. However, when the traveling of the vehicle M is restarted, the display of the virtual image VI by the display device 100 is also restarted.

In a case in which it is detected that the vehicle M is stopped on the basis of the control information of the brake ECU and the speed of the vehicle M by the environment sensor 166, the light shielding cover actuator 128B starts control to close the light shielding cover 128A. In a case in which it is detected that the vehicle M starts the traveling again by the environment sensor 166, the light shielding cover actuator 128B opens the light shielding cover 128A and restarts the display of the virtual image VI by the display device 100. The luminance or the virtual image visual recognition distance D of the virtual image VI at the time of the restart may take over the setting before closing the light shielding cover 128A, or may be newly set by the display control device 150 on the basis of the estimated temperature of the display element 120B estimated by the temperature estimater 151 at the timing when the light shielding cover 128A is opened.

In a case in which it is estimated by the temperature estimater 151 that the estimated temperature of the display element 120B is equal to or higher than the predetermined upper limit temperature, among the adjustment of the virtual image visual recognition distance D, the reduction of the luminance of the virtual image VI, and the close of the light shielding cover 128A, the determinator 152 may set a control order in advance as to which control is to be implemented with priority, may determine and implement the most effective control at a timing at which the estimated temperature of the display element 120B estimated by the temperature estimater 151 is equal to or higher than the predetermined upper limit temperature, or may simultaneously perform a plurality of controls. For example, the adjustment of the virtual image visual recognition distance D may be performed in a case in which the amount exceeding the upper limit temperature is small, the adjustment of the virtual image visual recognition distance D and the reduction of the luminance of the virtual image VI may be performed in a case in which the amount exceeding the upper limit temperature is medium, and the close of the light shielding cover 128A may be performed in a case in which the amount exceeding the upper limit temperature is large (however, the adjustment of the virtual image visual recognition distance D and the reduction of the luminance of the virtual image VI are performed in a case in which the vehicle M is not stopped).

[Process Flow]

Figure 8:
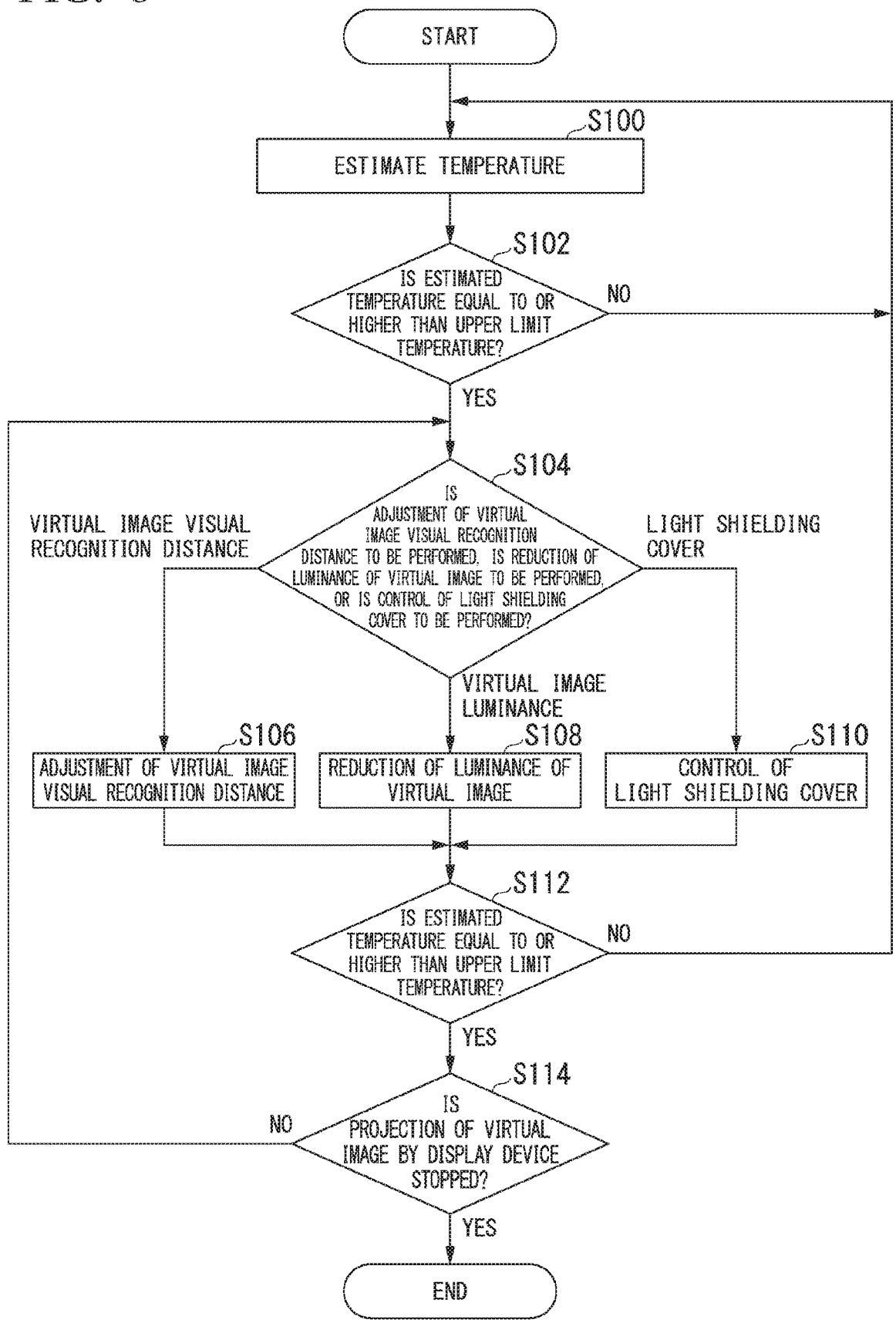
FIG. 8 is a flowchart showing a flow of a process executed by the display device of a first embodiment.

FIG. 8 is a flowchart showing a flow of a process executed by the display device 100 of the first embodiment. First, the temperature estimater 151 estimates the temperature of the display element 120B (step S100). Next, the temperature estimater 151 determines whether or not the estimated temperature of the display element 120B is equal to or higher than the predetermined upper limit temperature (step S102), and outputs a determination result to the determinator 152. In a case in which the determinator 152 does not determine that the estimated temperature is equal to or higher than the predetermined upper limit temperature, the process returns to step S100. In a case in which the determinator 152 determines that the estimated temperature is equal to or higher than the predetermined upper limit temperature, the determinator 152 determines the control to be performed among the adjustment of the virtual image visual recognition distance D, the reduction of the luminance of the virtual image VI, and the control of the light shielding cover 128A (step S104).

In a case in which it is determined in the process of step S104 that the adjustment of the virtual image visual recognition distance D is to be performed, the determinator 152 causes the image changer 154 to perform a process of reducing the virtual image visual recognition distance D (step S106). In a case in which it is determined in the process of step S104 that the reduction of the luminance of the virtual image VI is to be performed, the determinator 152 causes the drive controller 153 to perform a process of reducing the luminance of the virtual image VI (step S108). In a case in which it is determined in the process of step S104 that the control of the light shielding cover 128A is to be performed, the determinator 152 causes the drive controller 153 to perform the control for closing the light shielding cover 128A when the vehicle M is stopped (step S110). After the processes of steps S106, S108, and S110, the temperature estimater 151 determines again whether or not the estimated temperature of the display element 120B is equal to or higher than the predetermined upper limit temperature (step S112).

In a case in which it is not determined in the process of step S112 that the estimated temperature is equal to or higher than the predetermined upper limit temperature, the process returns to step S100. In a case in which it is determined in the process of step S112 that the estimated temperature is equal to or higher than the predetermined upper limit temperature, the driver or the like is caused to determine whether or not to stop the projection of the virtual image VI by the display device 100 (step S114), and in a case in which the projection is not stopped, the process returns to step S104. In a case in which it is determined that the projection of the virtual image VI is stopped after the process of step S114, the process is ended. This is the end of the description of the process of the present flowchart.

As described above, the display device 100 of the first embodiment includes the light projector 120 that outputs the light including the image, the optical mechanism 122 provided on the path of the image light IL output by the light projector 120 and including the lens of which the position is able to be adjusted in the optical axis direction, the concave mirror 126 that reflects the light passing through the optical mechanism 122 toward the front windshield 20 that is the reflector, the concave mirror actuator 182 that adjusts the reflection angle of the concave mirror 126, the lens actuator 180 that adjusts the virtual image visual recognition distance D in the optical mechanism 122, and the display control device 150 that controls the light projector 120, the optical mechanism 122, the concave mirror actuator 182, and the lens actuator 180. The display control device 150 includes the temperature estimater 151 that estimates the estimated temperature of the display element 120B, and the image changer 154 that controls the light projector 120 to change the virtual image visual recognition distance D in accordance with the estimated temperature that is estimated by the temperature estimater 151. Therefore, the display of information is able to be changed in accordance with the estimated temperature of the display element 120B, and a tolerance of the display device 100 to the temperature rise due to the sunlight is able to be improved.

The display control device 150 includes the drive controller 153 that changes the luminance of the virtual image VI in accordance with the estimated temperature that is estimated by the temperature estimater 151. Therefore, display of information is able to be changed in accordance with the estimated temperature of the display element 120B or the control for closing the light shielding cover 128A at the time when the vehicle M is stopped is able to be performed, and the tolerance of the display device 100 to the temperature rise due to the sunlight is able to be improved. Thus, the display device 100 is able to increase a magnification of a displayable virtual image.

Second Embodiment

Hereinafter, the display device 100 of the second embodiment will be described.

[Gradual Control]

In a case in which the determinator 152 outputs an estimation result that the estimated temperature of the display element 120B estimated by the temperature estimater 151 is equal to or higher than the predetermined upper limit temperature, the determinator 152 gradually performs the adjustment of the virtual image visual recognition distance D and the reduction of the luminance of the virtual image VI.

In a situation in which the display device 100 is used with the virtual image visual recognition distance D set to 15 [m] or more, for example, in a case in which the determinator 152 outputs the estimation result that the estimated temperature of the display element 120B estimated by the temperature estimater 151 is equal to or higher than the predetermined upper limit temperature, the determinator 152 first causes the image changer 154 to reduce the virtual image visual recognition distance D. After the control for reducing the virtual image visual recognition distance D, in a case in which the estimated temperature of the display element 120B estimated by the temperature estimater 151 is less than the predetermined upper limit temperature, the process is ended at that stage, and the estimation of the temperature of the display element 120B by the temperature estimater 151 is restarted. After the control for reducing the virtual image visual recognition distance D to a degree (for example, about 15 [m] to 10 [m]) that the driver does not feel discomfort, in a case in which a first condition is satisfied and the estimated temperature of the display element 120B estimated by the temperature estimater 151 is equal to or higher than the predetermined upper limit temperature, the drive controller 153 is caused to perform the reduction of the luminance of the virtual image VI. For example, the first condition may be set as a fact that an elapsed time from a start of the control for reducing the virtual image visual recognition distance D exceeds a first predetermined time, or may be set as a fact that the estimated temperature by the temperature estimater 151 exceeds a first threshold temperature.

After the control for reducing the luminance of the virtual image VI, in a case in which the estimated temperature of the display element 120B estimated by the temperature estimater 151 is less than the predetermined upper limit temperature, the process is ended at that stage, and the estimation of the temperature of the display element 120B by the temperature estimater 151 is restarted. After the control for reducing the luminance of virtual image VI, in a case in which the second condition is satisfied and the estimated temperature of display element 120B estimated by temperature estimater 151 is equal to or higher than the predetermined upper limit temperature, the image changer 154 is caused to further reduce the virtual image visual recognition distance D again (for example, 10 [m] or less). Similarly to the first condition, for example, the second condition may be set as a fact that an elapsed time from a start of the control for reducing the virtual image visual recognition distance D exceeds a second predetermined time, or may be set as a fact that the estimated temperature by the temperature estimater 151 exceeds a second threshold temperature. The second predetermined time is longer than the first predetermined time, and the second threshold temperature is higher than the first threshold temperature. The second condition may be set to an elapsed time from the start of the control for reducing the luminance of the virtual image VI.

The determinator 152 may implement the gradual control by the same purpose as described above by feedback control such as proportional-integral (PI) control. For example, the determinator 152 performs the PI control so that a difference between a target temperature (for example, the predetermined upper limit temperature or an arbitrary temperature equal to or less than the predetermined upper limit temperature) and the estimated temperature of the display element 120B by the temperature estimater 151 is 0. At this time, for example, in a case in which a value of an integral term is increased, control contents may be switched from the adjustment of the virtual image visual recognition distance D to the luminance adjustment of the virtual image VI (or both may be performed).

In a case in which the vehicle M is stopped during the above-described gradual control, the control for closing the light shielding cover 128A may be performed together.

By performing such gradual control, the number of operations of the lens actuator 180 and the concave mirror actuator 182 by the drive controller 153 is able to be suppressed, and a load on a motor portion of the lens actuator 180 and the concave mirror actuator 182 is able to be reduced.

[Process Flow 2]

Figure 9:
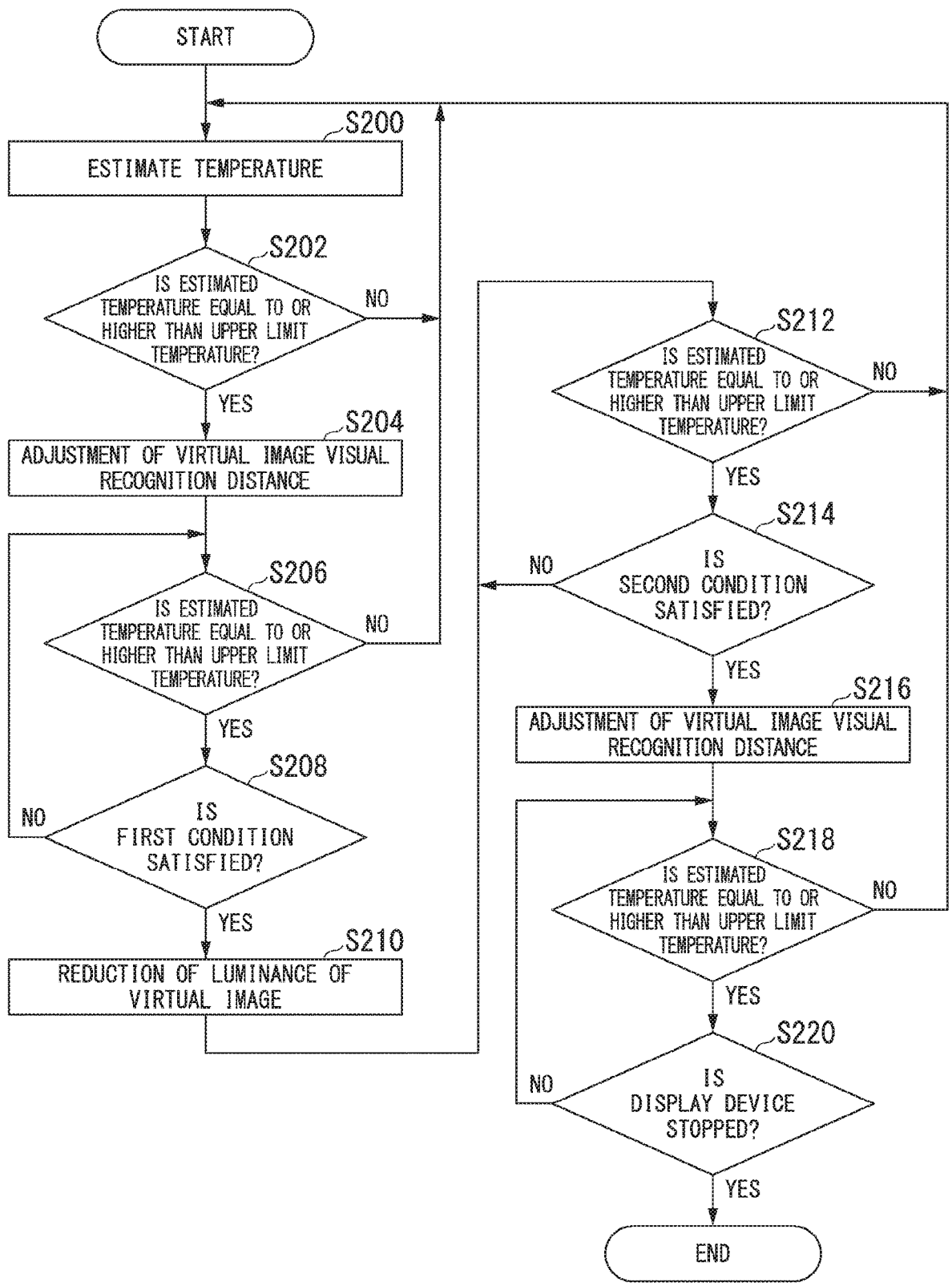
FIG. 9 is a flowchart showing the flow of the process executed by the display device of a second embodiment.

FIG. 9 is a flowchart showing the flow of the process executed by the display device 100 of the second embodiment.

First, the temperature estimater 151 estimates the temperature of the display element 120B (step S200). Next, the temperature estimater 151 determines whether or not the estimated temperature of the display element 120B is equal to or higher than the predetermined upper limit temperature (step S202), and outputs the determination result to the determinator 152. In a case in which the determinator 152 does not determine that the estimated temperature is equal to or higher than the predetermined upper limit temperature, the process returns to step S200. In a case in which the determinator 152 determines that the estimated temperature is equal to or higher than the predetermined upper limit temperature, the determinator 152 causes the image changer 154 to perform the process of reducing the virtual image visual recognition distance D (step S204). Next, the temperature estimater 151 determines again whether or not the estimated temperature of the display element 120B is equal to or higher than the predetermined upper limit temperature (step S206), and outputs the determination result to the determinator 152.

In a case in which it is determined in the process of step S206 that the estimated temperature is equal to or higher than the predetermined upper limit temperature, the determinator 152 determines whether or not the first condition is satisfied (step S208). In a case in which the determinator 152 does not determine that the first condition is satisfied, the process returns to step S206 after a predetermined time has elapsed. In a case in which the determinator 152 determines that the first condition is satisfied, the determinator 152 causes the drive controller 153 to perform the process of reducing the luminance of the virtual image VI (step S210). Next, the temperature estimater 151 determines again whether or not the estimated temperature of the display element 120B is equal to or higher than the predetermined upper limit temperature (step S212), and outputs the determination result to the determinator 152.

In a case in which it is determined in the process of step S212 that the estimated temperature is equal to or higher than the predetermined upper limit temperature, the determinator 152 determines whether or not the second condition is satisfied (step S214). In a case in which the determinator 152 does not determine that the second condition is satisfied, the process returns to step S212 after a predetermined time has elapsed. In a case in which the determinator 152 determines that the second condition is satisfied, the determinator 152 causes the image changer 154 to perform the process of reducing the virtual image visual recognition distance D in a case in which it is determined that the estimated temperature is equal to or higher than the predetermined upper limit temperature (step S216). Next, the temperature estimater 151 determines again whether or not the estimated temperature of the display element 120B is equal to or higher than the predetermined upper limit temperature (step S218), and outputs the determination result to the determinator 152. In a case in which it is determined that the estimated temperature is equal to or higher than the predetermined upper limit temperature, the determinator 152 determines (or confirms with the occupant) whether or not to stop the display device 100 (step S220). In a case in which it is not determined that the display device 100 is to be stopped, the process returns to step S218. In a case in which it is determined that the display device 100 is to be stopped, the process of the flowchart is ended.

As described above, in the display device 100 of the second embodiment, in addition to the same effect as that of the first embodiment, it is possible to reduce the load on the motor portion of the lens actuator 180 while maintaining the visibility of the virtual image VI of the occupant, by performing the control of the luminance or the light shielding cover 128A in addition to performing the temperature control by the adjustment of the virtual image visual recognition distance D.

[Other HUD Display Areas]

Instead of directly projecting the image on the front windshield 20, the display device 100 may project the image on a light transmissive reflective member such as a combiner provided between the position of the driver and the front windshield 20.

As described above, the display device 100 includes the light projector 120 that outputs the light including the image, the optical mechanism 122 provided on the path of the image light IL output by the light projector 120 and including the lens of which the position is able to be adjusted in the optical axis direction, the concave mirror 126 that reflects the light passing through the optical mechanism 122 toward the front windshield 20 that is the reflector, the concave mirror actuator 182 that adjusts the reflection angle of the concave mirror 126, the lens actuator 180 that adjusts the lens of the optical mechanism 122, and the display control device 150 that controls the light projector 120, the optical mechanism 122, the concave mirror actuator 182, and the lens actuator 180. The display control device 150 includes the temperature estimater 151 that estimates the estimated temperature of the display element 120B, and the image changer 154 that controls the light projector 120 to change the attractiveness of the virtual image VI in accordance with the estimated temperature that is estimated by the temperature estimater 151. Therefore, the display of information is able to be changed in accordance with the estimated temperature of the display element 120B, and a tolerance of the display device 100 to the temperature rise due to the sunlight is able to be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
    an image generation device configured to superimpose an image on a landscape and allow a viewer to visually recognize the image;
    a control device configured to control the image generation device;
    a light projector configured to output the image as light;
    an optical mechanism provided on a path of the light and capable of adjusting a distance from a predetermined position to a position at which the light is formed as a virtual image;
    a concave mirror configured to reflect light passing through the optical mechanism toward a reflector;
    a first actuator configured to adjust the distance in the optical mechanism; and
    a second actuator configured to adjust a reflection angle of the concave mirror,
    wherein the control device estimates a temperature of the light projector, and
    in a case in which the estimated temperature is equal to or higher than a predetermined upper limit temperature, the control device causes the first actuator to reduce the distance.

2. The display device according to claim 1,
    wherein, in a case in which the estimated temperature is equal to or higher than the predetermined upper limit temperature, the control device causes the light projector to reduce a luminance of the light.

3. The display device according to claim 1,
    wherein, in a case in which the estimated temperature is equal to or higher than the predetermined upper limit temperature, the control device causes the light projector to gradually reduce a luminance of the light or causes the first actuator to gradually reduce the distance.

4. The display device according to claim 3,
    wherein, when the control device gradually controls the light projector or the first actuator,
    in a case in which the estimated temperature is equal to or higher than the predetermined upper limit temperature, the control device causes the first actuator to reduce the distance,
    in a case in which the estimated temperature is equal to or higher than the predetermined upper limit temperature and a first condition is satisfied, the control device causes the light projector to reduce the luminance of the light, and
    in a case in which the estimated temperature is equal to or higher than the predetermined upper limit temperature and a second condition is satisfied, the control device causes the light projector to further reduce the distance.

5. The display device according to claim 1,
    wherein the control device measures a position and a direction of a subject device, and estimates the temperature in accordance with the measured information.

6. The display device according to claim 1,
    wherein the control device causes the first actuator to change an angle of the concave mirror so that the angle becomes an angle capable of reducing an influence of sunlight on the light projector.

7. The display device according to claim 1,
    wherein, in a case in which a vehicle on which a subject device is mounted is stopped, the control device operates a light shielding material that blocks the path of the light so that sunlight is not incident on the light projector.

8. A display control method to control a display device using a computer, the display device comprising:
    an image generation device configured to superimpose an image on a landscape and allow a viewer to visually recognize the image;
    a control device configured to control the image generation device;
    a light projector configured to output the image as light;
    an optical mechanism provided on a path of the light and capable of adjusting a distance from a predetermined position to a position at which the light is formed as a virtual image;
    a concave mirror configured to reflect light passing through the optical mechanism toward a reflector;
    a first actuator configured to adjust the distance in the optical mechanism; and a second actuator configured to adjust a reflection angle of the concave mirror, wherein the display control method comprises:

estimating a temperature of the light projector; and causing the first actuator to reduce the distance in a case in which the estimated temperature is equal to or higher than a predetermined upper limit temperature.

9. A non-transitory computer-readable storage medium that stores a program for a display device, the display device comprising:

an image generation device configured to superimpose an image on a landscape and allow a viewer to visually recognize the image;

a control device configured to control the image generation device;

a light projector configured to output the image as light;

an optical mechanism provided on a path of the light and capable of adjusting a distance from a predetermined position to a position at which the light is formed as a virtual image;

a concave mirror configured to reflect light passing through the optical mechanism toward a reflector;

a first actuator configured to adjust the distance in the optical mechanism; and a second actuator configured to adjust a reflection angle of the concave mirror, wherein the program causes a computer mounted in the display device to:

estimate a temperature of the light projector; and cause the first actuator to reduce the distance in a case in which the estimated temperature is equal to or higher than a predetermined upper limit temperature.

* * * * *